United States Patent [19]

Fasano et al.

[11] Patent Number: 5,438,483
[45] Date of Patent: Aug. 1, 1995

[54] BRACKET ASSEMBLY FOR FRONT MOUNTED CIRCUIT BREAKER

[75] Inventors: Michael Fasano, Watertown; James Bugryn, Bristol, both of Conn.

[73] Assignee: Carlingswitch, Inc., Plainville, Conn.

[21] Appl. No.: 298,609

[22] Filed: Aug. 31, 1994

[51] Int. Cl.⁶ .............................................. H02B 1/01
[52] U.S. Cl. ...................................... 361/825; 174/66; 335/167; 200/296; 248/27.3
[58] Field of Search ............... 361/114–115, 361/644, 652, 654–658, 825; 335/164–169; 174/66–67; 200/293, 295–296, 303; 248/27.3

[56] References Cited

U.S. PATENT DOCUMENTS

| | | | |
|---|---|---|---|
| 4,454,565 | 6/1984 | Krasij et al. | 200/296 |
| 5,128,828 | 7/1992 | Mrenna et al. | 200/296 |
| 5,146,056 | 9/1992 | Kuczynski | 200/296 |

*Primary Examiner*—Bot L. Ledynh
*Attorney, Agent, or Firm*—McCormick, Paulding & Huber

[57] ABSTRACT

A bracket assembly has rearwardly projecting metal wings mounted in a plastic cover plate. The circuit breaker is normally rear mounted in a panel. The cover plate is secured to the breaker with fasteners that secure the metal wings to the breaker housing. The metal wings have legs slidably received in the plastic cover plate providing a convenient subassembly for mounting the breaker from the front of a panel.

7 Claims, 2 Drawing Sheets

BRACKET ASSEMBLY FOR FRONT MOUNTED CIRCUIT BREAKER

BACKGROUND OF THE INVENTION

This invention relates generally to the mounting of circuit breakers in panel openings, and deals more particularly with a bracket assembly for mounting a circuit breaker from the front of a panel. Conventional circuit breakers are generally made for rear mounting in panel openings that are of small size to receive a boss on the front of the breaker. Some smaller breakers have been provided with integrally molded wings to provide for front mounting in much the same manner as an electrical switch. In addition, conventional circuit breakers of one size have been provided for use in place of larger breakers with an adapter bracket such as that shown in U.S. Pat. No. 4,454,565.

SUMMARY OF THE INVENTION

The general object of the present invention is to provide a bracket assembly for a conventional circuit breaker of the type which is normally mounted from the rear of the panel, the bracket assembly being designed to be secured directly to the breaker and to provide an assembly of bracket plus breaker that can be mounted in a rectangular opening from the front of the panel.

In its presently preferred form the bracket assembly comprises a molded plastic cover plate having an opening for receiving the circuit breaker handle or toggle together with its boss provided on the front of the split case molded circuit breaker. The cover plate has a length such that the ends of the plate abut the panel front face adjacent the ends of the panel opening. A pair of rearwardly projecting wings are provided for engaging the ends of the panel opening, and these rearwardly projecting wings cooperate with the cover plate to retain the breaker and bracket assembly in the panel opening.

Each of these wings has tab portions that are aligned with openings in the circuit breaker case for receiving fasteners that secure the split circuit breaker case half sections together.

Means is provided for mounting these wings to the rear of the cover plate, and said means preferably comprises rearwardly open cavities defined by the cover plate with each wing having a generally L-shape so that one leg of the L defines a portion that is slidably received in the cavity so that the other leg of the L can be provided alongside one end of the circuit breaker case. This other leg has a free end that includes two resilient portions extending generally forwardly toward, but spaced from, the cover plate ends so as to receive the mounting plate therebetween. These L-shaped wings are slidably received in the cover plate for movement between a preliminary position and a locked or "home" position, wherein the tab portions are aligned with the openings in the circuit breaker case. The tab portions are provided on the free end portion of the legs so received in the cavity while the other leg of the L-shaped wing is of inverted T-shape with the forwardly projecting panel engaging portions at the ends of the cross bar of the T.

DETAILED DESCRIPTION

Turning now to the drawings in greater detail, a conventional split case circuit breaker is indicated generally at 10, below a bracket assembly constructed in accordance with the present invention, indicated generally at 12. The circuit breaker 10 is of conventional configuration being of the molded split case variety that requires assembly with a plurality of rivets or screw fasteners (not shown) provided in openings as indicated generally at 10a and 10b in FIG. 1. The front face of the circuit breaker 10 is indicated generally at 10c, and this front face typically includes a pair of mounting holes (not shown) that are used when the breaker is conventionally mounted rearwardly in a mounting panel. The mounting panel in such a case would have a circular opening adapted to receive the boss 10d of the breaker, and mounting holes would also be provided on the mounting plate for securing the breaker in place. Such mounting holes would, of course, be visible from the front of the plate and it would be impossible to assemble the breaker from the front of the plate with such conventional configuration for a circuit breaker of this type.

Figure 2:
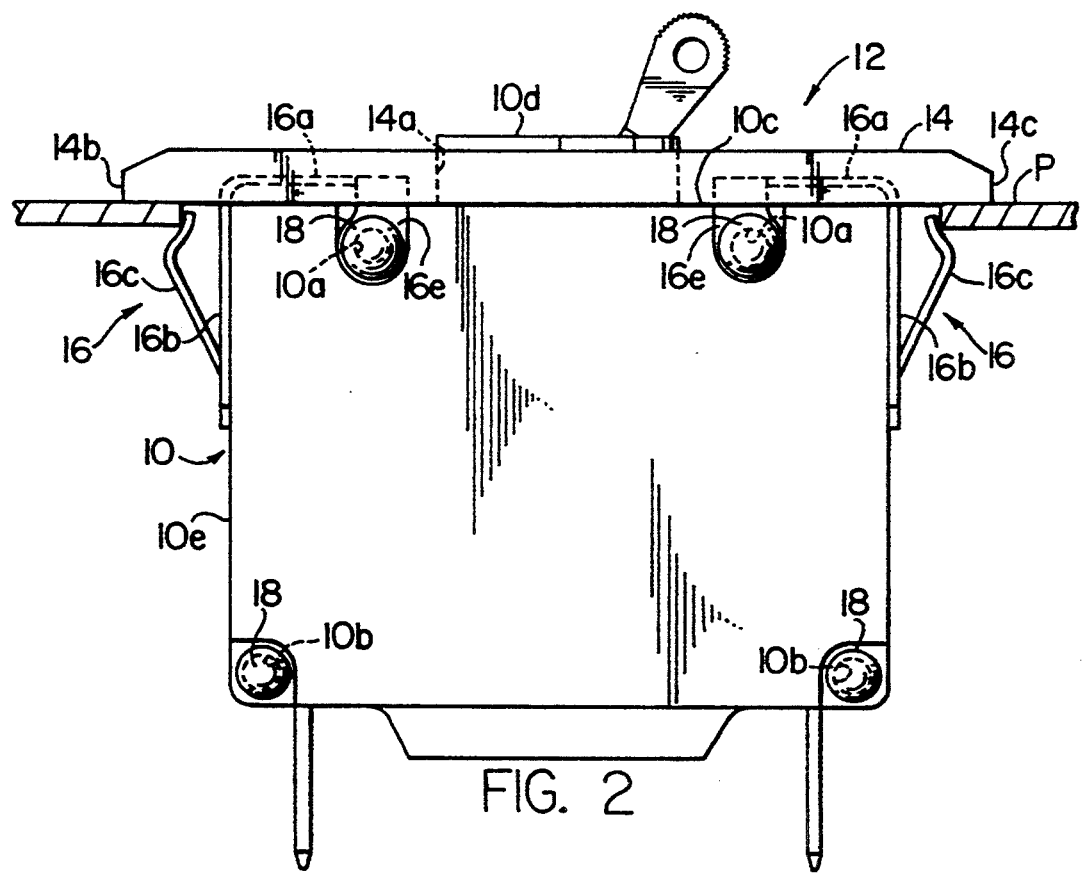
FIG. 2 is a view similar to FIG. 1 but illustrates the bracket assembly with both wings and secured to the breaker in a rectangular panel opening.

The present invention provides for preassembling a bracket assembly 12 with such a split case circuit breaker 10 so that the entire assembly of breaker and bracket can be inserted from the front of the mounting panel as best shown in FIG. 2. The present invention relates to the unique bracket assembly when used in combination with such a conventional split case circuit breaker and the description to follow provides an understanding of the construction for this bracket assembly 12.

Figure 1:
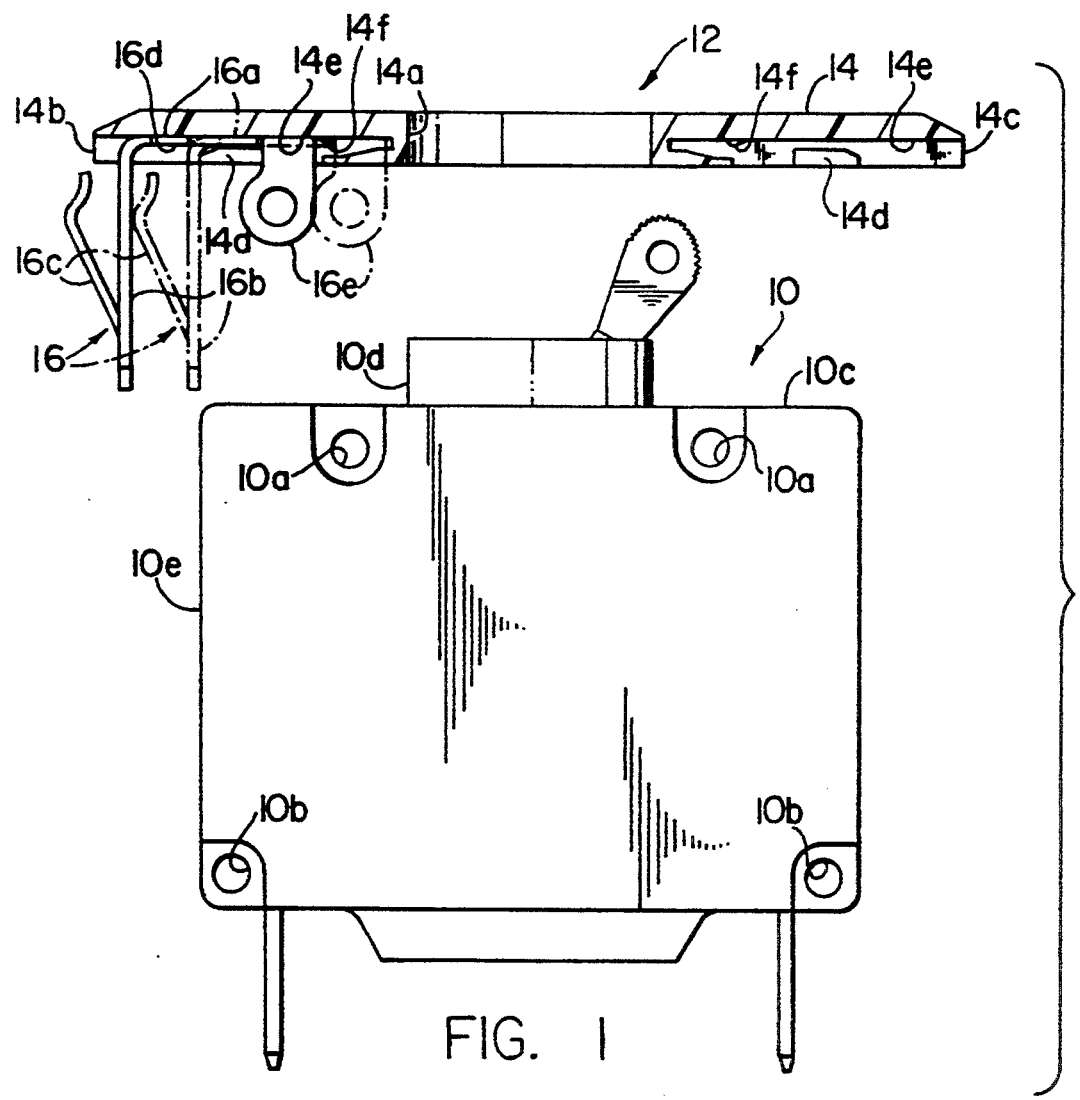
FIG. 1 is an exploded side elevational view of a conventional circuit breaker of the type adapted to be mounted from the rear of a panel and a bracket assembly of the present invention illustrated partially in section and showing one wing in two positions, the broken lines being a "home" position.
Figure 3:
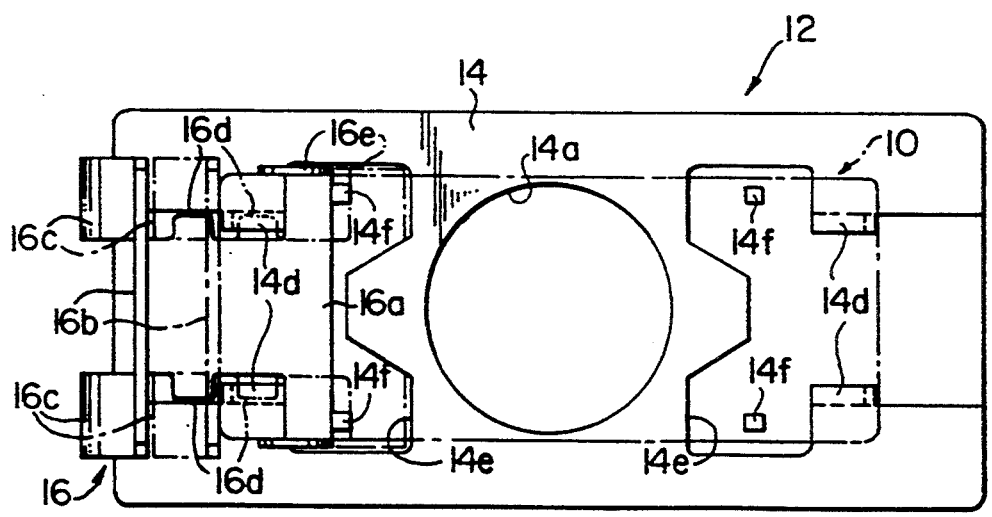
FIG. 3 is a bottom plan view of the bracket assembly illustrated in FIG. 1 with the outline of the circuit breaker being indicated in phantom lines, and with one wing provided in the "home" position in broken lines corresponding to the position for the one wing shown in FIG. 1.

FIG. 1 shows the bracket assembly 12 in vertical elevation, with portions depicted in section, while FIG. 3 shows the bracket assembly in a bottom plan view to illustrate in greater detail the formed metal wings 16, 16 that are adapted to be received in cavities provided for this purpose in the rear or underside of the molded plastic cover plate 14.

As best shown in FIG. 2 the cover plate 14 includes an opening 14a that is provided with a suitable shape for receiving the boss 10d on a conventional split case circuit breaker 10. While the upstanding boss 10d shown is of generally cylindrical contour at its base, dictating a generally cylindrical opening 14a in the molded plastic cover plate 14 other suitable shapes might be provided to accommodate breakers with bosses of different geometry.

The cover plate 14 has a length such that the plate ends 14b and 14c abut the front face of the panel adjacent the ends of the panel opening as best shown in FIG. 2. The panel opening therefor has a length somewhat less than the length of the molded plastic cover plate 14. The panel opening has a length somewhat greater than the overall length of the circuit breaker 10 to allow clearance for metal wings 16 that include portions for engaging the ends of the panel opening as shown in FIG. 2, these wings 16 serve to hold the assembled cover plate 14 and circuit breaker 10 in the panel opening.

The width of the panel opening is such that it is designed to snugly receive the width of the conventional circuit breaker 10. FIG. 3 shows the circuit breaker 10 in phantom lines and although the panel opening is not shown in this view it will be apparent that the rectangular size of the panel opening is designed to accommodate this particular size circuit breaker.

With particular reference to FIG. 1, and referring in greater detail to the configuration of the molded plastic cover plate 14, the underside or rear face of the molded cover plate 14 includes rearwardly facing cavities that also open to the ends of the cover plate for slidably receiving horizontally extending portions 16a of each wing 16. The wing 16 of FIG. 1 is shown in a preliminary position (full lines) prior to being pushed into its "home" or locked position (the latter being illustrated in broken lines in this view).

Each wing 16 has a generally L-shape with one leg portion 16a oriented at right angles to another leg portion 16b. The portion 16b is adapted, when in its "home" position to lie against the end 10e of the circuit breaker as best shown in FIG. 2. This leg 16b of the wing 16 has a generally T-shaped lower end, the cross bar of the T includes forwardly projecting portions 16c that include upper ends adapted to engage the underside or the rear side of the panel P as best shown in FIG. 2 when the bracket assembly and circuit breaker are assembled in the panel opening in accordance with the present invention.

Figure 3A:
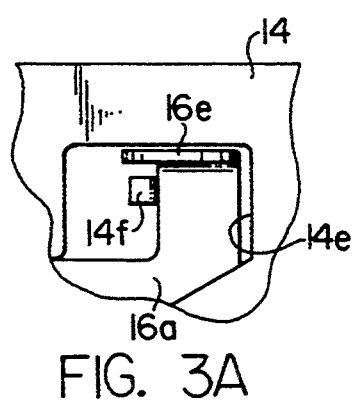
FIG. 3A is a detailed fragmentary plan view of a portion of the view of FIG. 3.

The wings 16 are adapted to slide inwardly toward one another in their respective cavities provided in the rear side of the molded plastic cover 14. Each cavity is designed to cooperate with tabs 16d on the leg 16a of the wing 16 so that the wing must be forcibly moved from the solid line position shown in FIG. 1 to the broken line position. Each wing is locked in position as a result of bending as it is moved past a small protuberance 14f provided in each rearwardly facing cavity 14e. Once the tabs 16d pass the portion 14d the tabs are locked in detents behind the portions 14f and return movement of the wings from the "home" or locked position to the preliminary position shown in full lines in FIG. 1 is precluded. FIG. 3A shows this result to best advantage.

The inner free end portions of the wings 16 define depending tab portions 16e that have openings which in the locked position of the wings are aligned with the openings 10a in the circuit breaker case. Thus, screw fasteners or rivets can be used not only to assemble the switch case half sections to one another, but also can be used to assemble the wing shaped brackets in their locked positions so that the circuit breaker is thereby secured to the molded plastic cover plate 14 as shown FIG. 2. FIG. 2 shows rivets 18, 18 provided in these tab portions 16e for securing the wings 16 and hence the cover plate 14 to the circuit breaker 10.

As mentioned previously FIG. 2 also shows the entire assembly provided in the panel opening as a result of being mounted from the front of the panel in contradistinction to the conventional rear mounting for split case circuit breakers in panels generally. That is, the circuit breaker 10 of FIG. 1 would normally be mounted rearwardly in a small circular opening of the panel and be secured to the panel by visible screws provided in the front of the panel. The unique bracket assembly of the present invention is designed to permit mounting of the circuit breaker 10 from the front of the panel all as described hereinabove.

We claim:

1. A bracket assembly for front mounting of a split case molded circuit breaker in a rectangular panel opening, said bracket assembly comprising:
   a molded plastic cover plate having an opening for receiving the circuit breaker handle or toggle, said cover plate having a length such that the plate ends abut the panel's front face adjacent the ends of the panel opening,
   a pair of rearwardly projecting wings for engaging the ends of the panel opening, said wings having tab portions aligned with openings in the split case circuit breaker for receiving fasteners that secure the split case circuit breaker together, and
   means mounting said wings to the rear of said cover plate.

2. The bracket assembly of claim 1 wherein said means mounting said wings to the rear of said cover plate comprise rearwardly open cavities defined by said cover plate, each wing having a portion retained in one of said cavities.

3. The bracket assembly of claim 2 wherein each wing is generally L-shaped such that one leg defines said portion received in said cavity, said L-shaped wing having its other leg alongside the end of the split case circuit breaker, and said other leg having a free end that includes two resilient portions extending generally forwardly toward but spaced from said cover plate ends.

4. The bracket assembly of claim 3 wherein said one leg portion of each L-shaped wing is slidably received in said cover plate cavity between a preliminary assembly position and a locked position wherein said tab portions are aligned with openings in the split case circuit breaker for receiving fasteners that secure the split case circuit breaker together.

5. The bracket assembly of claim 4 wherein said one leg of each L-shaped wing has a free end portion on which said tab portions are integrally formed.

6. The bracket assembly of claim 5 wherein said wings are formed of metal.

7. The bracket assembly of claim 6 wherein said cavities define detents for receiving said L-shaped legs during assembly with said cover plate while inhibiting disassembly thereof.

* * * * *